United States Patent
Lee et al.

(10) Patent No.: US 10,205,767 B2
(45) Date of Patent: Feb. 12, 2019

(54) MANAGEMENT SYSTEM AND METHOD FOR A BIG DATA PROCESSING DEVICE

(71) Applicant: LG CNS CO., LTD., Seoul (KR)

(72) Inventors: Joo Youl Lee, Seoul (KR); Seung Kab Rho, Seoul (KR); Seok Keun Oh, Seoul (KR); Sang Hyun Yun, Seoul (KR); Su Yeon Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 595 days.

(21) Appl. No.: 14/495,474

(22) Filed: Sep. 24, 2014

(65) Prior Publication Data

US 2015/0088930 A1 Mar. 26, 2015

(30) Foreign Application Priority Data

Sep. 24, 2013 (KR) .................. 10-2013-0113503

(51) Int. Cl.
*G06F 17/30* (2006.01)
*H04L 29/08* (2006.01)

(52) U.S. Cl.
CPC ...... *H04L 67/025* (2013.01); *G06F 17/30575* (2013.01)

(58) Field of Classification Search
CPC ................... H04F 67/025; G06F 17/30575
USPC ..................................................... 707/770
See application file for complete search history.

(56) References Cited

U.S. PATENT DOCUMENTS

| | | | | |
|---|---|---|---|---|
| 6,014,760 A * | 1/2000 | Silva | ............. | G01R 31/318307 714/46 |
| 6,115,471 A * | 9/2000 | Oki | ......... | G06Q 30/06 380/242 |
| 7,536,686 B2 * | 5/2009 | Tan | .......... | G06F 8/61 713/100 |
| 7,707,573 B1 * | 4/2010 | Marmaros | ........ | G06F 8/61 709/224 |
| 9,058,230 B1 * | 6/2015 | van Rietschote | ........ | G06F 8/61 |

(Continued)

FOREIGN PATENT DOCUMENTS

| KR | 10-2011-0000737 A | 1/2011 |
|---|---|---|
| KR | 10-1218087 B1 | 1/2013 |
| KR | 10-1255909 B1 | 4/2013 |

OTHER PUBLICATIONS

Y. S. Min, K. S. Jin, H. Y. Kim and Y. K. Kim. "A Trend to Distributed File Systems for Cloud Computing", ETRI Electronics and Telecommunications Trends, vol. 24, No. 12, p. 55-68, (2009) (with English Translation).

*Primary Examiner* — Tony Mahmoudi
*Assistant Examiner* — Michael Le
(74) *Attorney, Agent, or Firm* — KED & Associates LLP (57) ABSTRACT

Provided is a management system for a big data processing device that includes a system management master node and at least one system management agent node communicatively coupled to the system management master node over a network. A first request-based communication path may be provided for transmitting data from a system management agent node to the system management master node and a second response-based communication path is provided for transmitting data from the system management master node to the system management agent node. The system management agent node may be configured to detect whether an instruction is included in a response received over the second communication path.

13 Claims, 7 Drawing Sheets

(56) References Cited

U.S. PATENT DOCUMENTS

| | | | | |
|---|---|---|---|---|
| 2005/0027846 A1* | 2/2005 | Wolfe | ............... | G06F 8/61 709/223 |
| 2005/0108708 A1* | 5/2005 | Im | ............... | G06F 8/61 717/178 |
| 2005/0120106 A1* | 6/2005 | Albertao | ............... | G06F 8/65 709/223 |
| 2007/0199076 A1* | 8/2007 | Rensin | ............... | H04L 29/06027 726/27 |
| 2008/0276301 A1* | 11/2008 | Nataraj | ............... | G06F 8/60 726/3 |
| 2009/0077569 A1* | 3/2009 | Appleton | ............... | H04L 41/024 719/318 |
| 2011/0246551 A1* | 10/2011 | Giancaspro | ............... | G05B 15/02 709/202 |

* cited by examiner

| REQUEST | |
|---|---|
| DATA ITEM | TYPE |
| AUTHENTICATION INFORMATION | AUTHENTICATION MESSAGE |
| NODE INFORMATION | NODEDTO |
| INSTRUCTION PROCESSING RESULT LIST | ARRAYS |
| TRANSMIT TIME | LONG |

FIG. 6B

| DATA ITEM | TYPE |
|---|---|
| RESPONSE | |
| NODE ID | STRING |
| AUTHENTICATION RESULT MESSAGE | AUTHENTICATION RESULT MESSAGE |
| NODE MONITORING ITEM LIST | ARRAY |
| NODE MONITORING ITEM LIST BEING DELETED | ARRAY |
| MANAGEMENT INSTRUCTION LIST | ARRAYS |
| MESSAGE RECEPTION INTERVAL | INT |
| TRANSMIT TIME | LONG |

MANAGEMENT SYSTEM AND METHOD FOR A BIG DATA PROCESSING DEVICE

CROSS-REFERENCE TO RELATED APPLICATION

This application claims priority under 35 U.S.C. § 119 to Korean Application No. 10-2013-0113503 filed on Sep. 24, 2013, whose entire disclosure is hereby incorporated by reference.

BACKGROUND

1. Field

Embodiments may relate to a technology for managing a big data processing device and more particularly to a management system and method for a big data processing device capable of integrally managing installation, setting and control for a big data system based on a distributed database at a single PC server.

2. Background

Systems and methods for big data processing devices are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Explanation of the present disclosure is merely an embodiment for structural or functional explanation, so the scope of the present disclosure should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

A Hadoop may be a project developed based on open source software and a distributed computing framework for storing and analyzing a large volume of typical/atypical data. A software library in the Hadoop may be considered as a technology helping to distribute data with a plurality of computers for effectively manage the large volume of the data.

Korean Patent Registration No. 10-1255909 relates to a Hadoop file system guaranteeing data locality being processed in a corresponding node when a client requests a file in order to remarkably decrease network traffic. Such Hadoop file system may process a file download request in a corresponding server thereby minimizing a client response time and may directly transmit the file from the corresponding server to a client thereby minimizing a network communication with other server to improve performance.

Korean Patent Registration No. 10-1218087 relates to an input format extraction method for binary data analysis in a Hadoop map-reduce and an analysis method for binary data using the same. In the binary data analysis method, when the binary data with a fixed length is distribution-processed in a Hadoop environment, the binary data may be processed without a data format conversion process thereby a relatively small storage space is required and a processing time may be shortened.

As broadly described and embodied herein, a management system and method for a big data processing device capable of integrally managing installation, setting and control for a big data system based on a distributed database at a single PC server.

Embodiments may provide a management system and method for a big data processing device capable of transmitting a state information message for a distributed database through asymmetric communication.

Embodiments may provide a management system and method for a big data processing device capable of inserting an instruction into a specific position of a queue according to a processing importance of the instruction.

Figure 1:
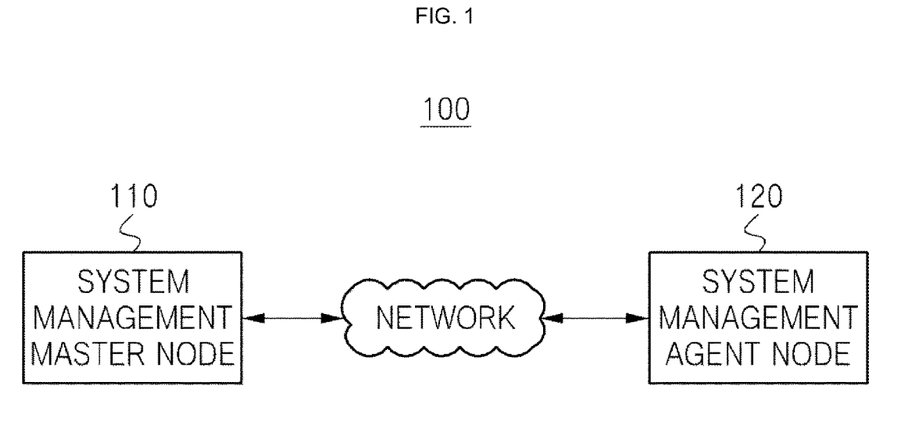
FIG. 1 is a block diagram of a management system for a big data processing device.
Figure 2:
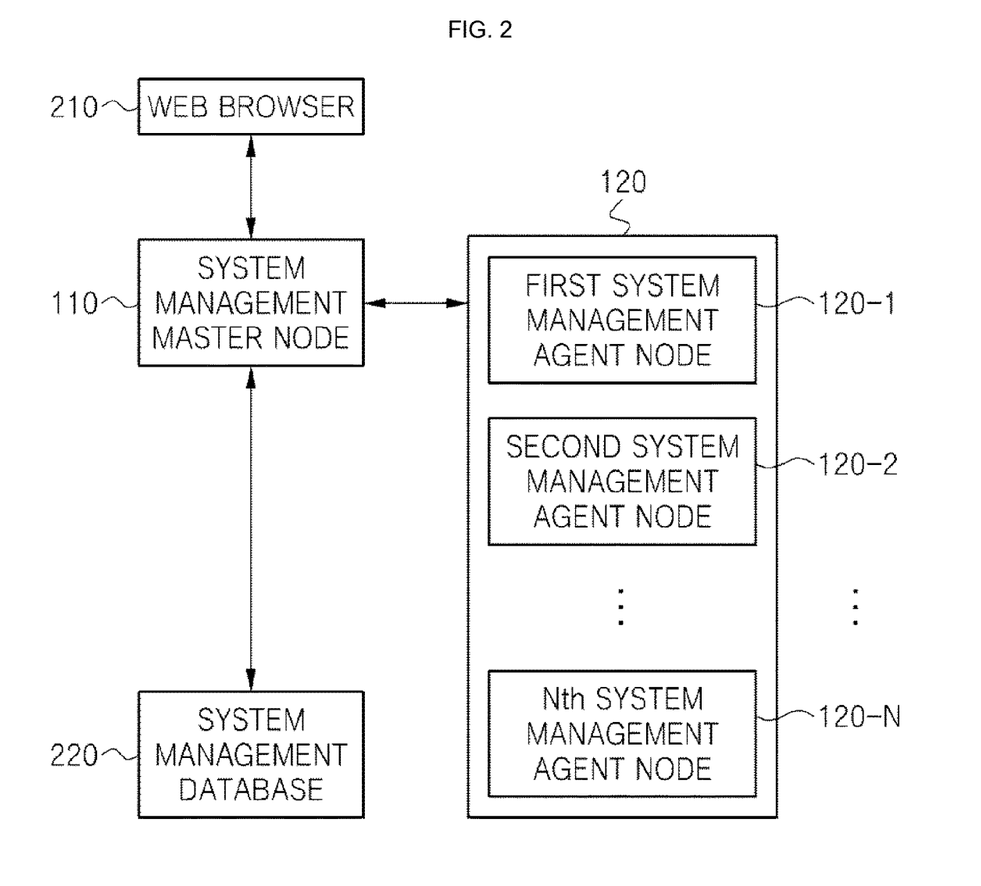
FIG. 2 is a block diagram of a management system for a big data processing device of FIG. 1.

FIG. 1 is a block diagram of a management system for a big data processing device and FIG. 2 is a block diagram of a management system for a big data processing device of FIG. 1. Other embodiments and configurations may also be provided.

Referring to FIG. 1 and FIG. 2, a management system for a big data processing device 100 may include a system management master node 110 and system management agent node 120.

The system management master node 110 may include a first request-based communication path from the system management agent node 120 and a second response-based communication path for the system management agent node 120. The system management master node 110 may transmit a request information received by the first communication path to the system management agent node 120. Herein, system management master node 110 may set up a plurality of system management agent nodes 120 and the first and the second communication path.

In at least one embodiment, system management master node 110 may be requested to provide instructions for installation of a distributed database from a client through a web browser 210. Herein, the client may request the installation for the distributed database to the system management master node 110, where the distributed database may have a specification for processing an immense volume of data.

The system management master node 110 may transmit an instruction to the system management agent node 120. Herein, the instruction may include an installation specification for a distributed database requested from a web browser 210 through the second communication path. The system management master node 110 may store information about the installation specification for the distributed database in a system management database 220, before the system management master node 110 transmits the instruction including the installation specification for the distributed database to the system management agent node 120.

In at least one embodiment, the system management database 220 may be connected with the system management master node 110 to manage information for the distributed database. The system management database 220 may store installation information and setting information for the distributed database.

The system management master node 110 may transmit an instruction including the installation specification for the distributed database to the system management agent node 120 through the second communication path.

The system management master node 110 may receive a message including state information for the distributed database from the system management agent node 120 through the first communication path.

In at least one embodiment, the system management master node 110 may receive an authentication information request message for the client, an identification message for the system management agent node 120, a state information message for the system management agent node 120 and a processing result message for the instruction including the installation specification of the distributed database through the first communication path periodically at prescribed time intervals. For example, the system management master node 110 may receive authentication information for the system management agent node 120 every 5 seconds. The system management master node 110 may also receive an identification number (e.g. the identification number corresponds to 1~N) for the system management agent node 120, may receive the state information for the system management agent node 120 and the processing result for the instruction including the installation specification of the distributed database at every 5 seconds.

The system management master node 110 may transmit the state information for the distributed database received from the system management agent node 120 through the first communication path to the web browser 210. Herein, the web browser 210 may provide the state information for the distributed database to the client. For example, the state information for the distributed database may correspond to error information occurring during an installation procedure of the distributed database, a distributed database IP information and the identification number (e.g. the identification number corresponds to 1~N) for the system management agent node 120.

The system management master node 110 may manage a system management agent in order to provide service for the distributed database, JDK (Java Developer Kit) and a distributed database binary file.

Figure 4A:
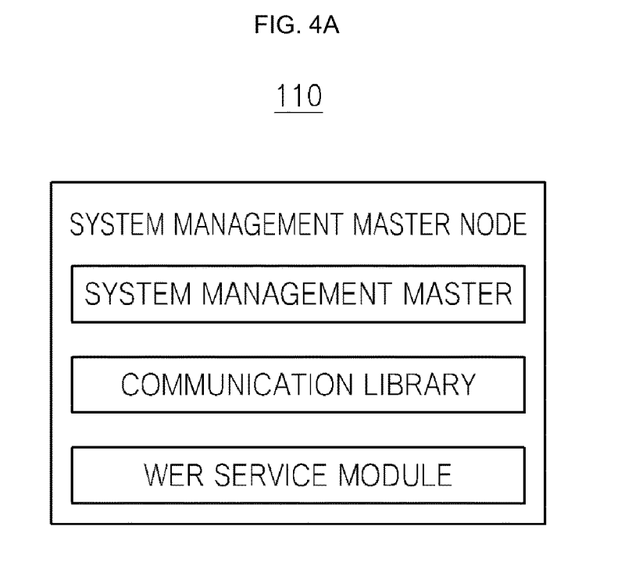
FIG. 4A is a block diagram of a structure of a system management master node in a management system for a big data processing device of FIG. 1.

In at least one embodiment, referring to FIG. 4A, the system management master node 110 may comprise a system management master, a communication library and a web service module. Herein, the system management master may communicate with the system management agent node 120, the communication library may serialize information received from the system management agent node 120 as a data serialization system, and the web service module may provide a web server connected with the web browser 210.

The system management master node 110 may check an activation state for a specific distributed database received periodically to store installation specification information for a specific distributed database in the system management database 220 when the activation state for the specific distributed database is normal. Herein, the system management database 220 may be connected with the system management server to manage installation specific information for the distributed database.

The system management master node 110 may receive an identification code for an installation error of the distributed database from the system management agent node 120. In at least one embodiment, the system management master node 110 may analyze an installation error identification code of the distributed database to improve the activation state for the specific distributed database and may retransmit the installation specification information for the improved specific distributed database to the system management agent node 120. For example, the installation error identification code may include an installation path error code for the distributed database, an installation specification error code or an installation information error code.

The system management master node 110 may check an importance for an instruction including the installation specification information for the distributed database to include a rank code for the importance thereof into the instruction and to transmit the instruction included the rank code to the system management agent node 120. For example, the system management master node 110 may cause a rank code C or D to be included in an instruction when the instruction is a general instruction, may cause a rank code B to be included in an instruction when the instruction is processed quickly and may cause a rank code A to be included in an instruction when the instruction is processed urgently to transmit the instruction to the system management agent node 120.

The system management agent node 120 may include the first request-based communication path to the system management master node 110 and the second response-based communication path from the system management master node 110. The system management agent node may detect whether an instruction is in a response received from the second communication path or not. Herein, a plurality of the system management agent nodes 120 may set up one system management master node 110 and the first and the second communication paths.

The system management agent node 120 may transmit an authentication information request message for the system management agent node 120, an identification message, a state information message and a processing result message about an instruction including an installation specification of the distributed database through the first communication path periodically at prescribed time periods. Herein, the system management agent node 120 may change a time (e.g., a time, duration, period) by which a message is transmitted to the system management master node through the first communication path according to a network state (e.g. network state may include velocity and instant process capacity) or a message importance.

The system management agent node 120 may store an instruction in a queue when the instruction is detected in a response received from the second communication path. In at least one embodiment, the system management agent node 120 may compare a rank code about an importance of an instruction including an installation specification information for the distributed database received from the system management master node 110 and a rank code of an instruction stored in a queue to insert the instruction into a specific position of the queue.

In at least another embodiment, the system management agent node 120 may classify the instruction according to the installation specification information for the distributed database received from the system management master node 110 to insert the instruction into a specific position of the queue.

The system management agent node 120 may install the specific distributed database according to the installation specification information for the distributed database and may transmit an activation state for the specific distributed database to the system management master node through the first communication path periodically. Herein, the activation state for the specific database may correspond to a state in which an installation process for the specific database is normal or a state in which an installation process for the specific database is abnormal.

In at least one embodiment, the system management agent node 120 may transmit an error identification code to the system management master node 110 when an error occurs during an installation procedure of the specific distributed database. The error identification code may include an installation path error code for the distributed database, an installation specification error code or an installation information error code.

Figure 4B:
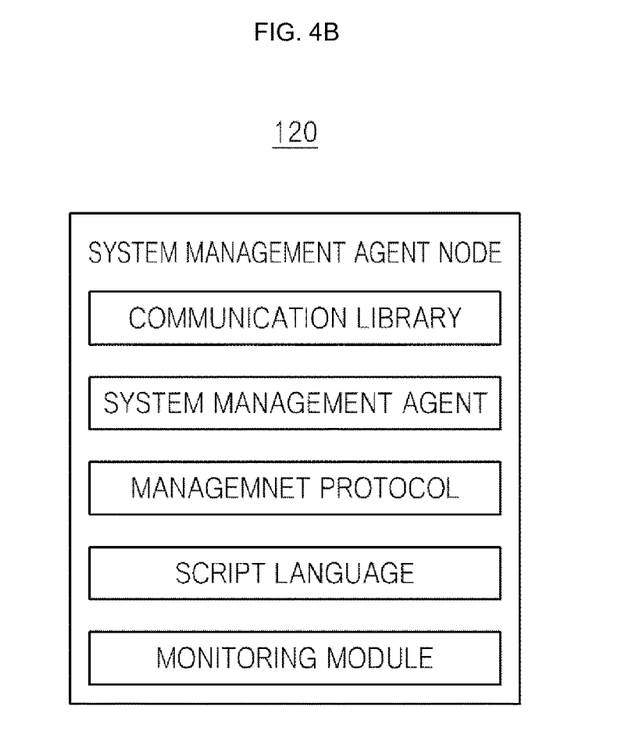
FIG. 4B is a block diagram of a structure of a system management agent node in a management system for a big data processing device of FIG. 1.

In at least one embodiment, referring to FIG. 4B, the system management agent node 120 may include a communication library, a system management agent, a management protocol, a script language and a monitoring module. Herein, the communication library may serialize information received from the system management master node 120 as a data serialization system, the system management agent may enable communication with the system management master node 110, the management protocol may provide tools for managing a network state of the system management agent node 120, the script language may correspond to combination of instructions used in a cell and may interpret an instruction received from the system management master node 110, and the monitoring module may correspond to a tool for monitoring a usage state of the distributed database.

Figure 3:
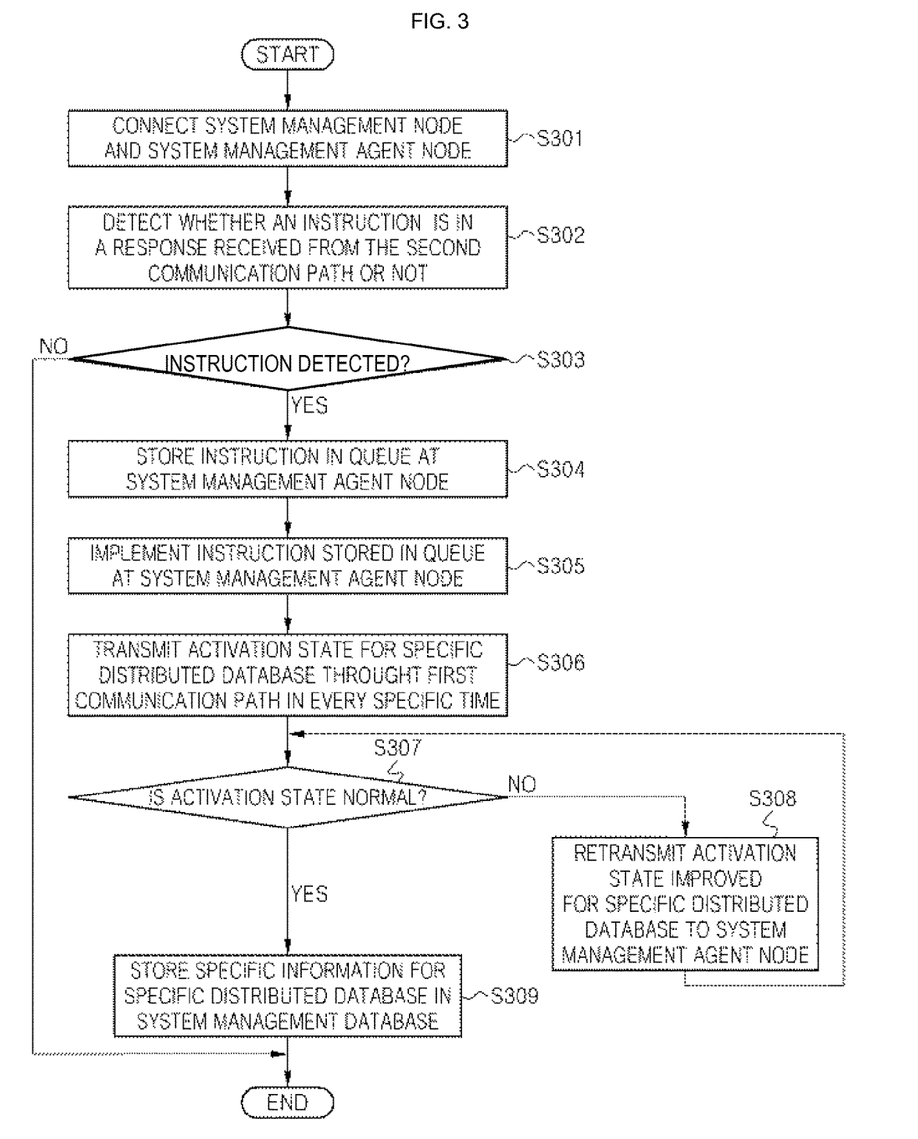
FIG. 3 is a flowchart showing a management method for a big data system management performed in a management system for a big data processing device of FIG. 1.

FIG. 3 is a flowchart showing a management method for a big data system management performed in a management system for a big data processing device of FIG. 1. Other embodiments and configurations may also be provided.

Referring to FIG. 3, the system management master node 110 may be connected with the system management agent node 120 through a network, in step S301.

The system management agent node 120 may include a first request-based communication path for the system management master node 110 and a second response-based communication path from the system management master node 110. The system management agent node 120 may detect whether or not an instruction is included in a response received over the second communication path, in step S302. Herein, the system management master node 110 may include a first request-based communication path from the system management agent node 120 and a second response-based communication path from the system management agent node 120. The system management master node 110 may transmit a request information received over the first communication path to the system management agent node 120.

In at least one embodiment, the system management agent node 120 may send an authentication information request message for the system management agent node 120, an identification message, a state information message and a processing result message about an instruction including an installation specification of the distributed database through the first communication path periodically at prescribed time periods.

The system management agent node 120 may store the instruction in a queue when the instruction is detected from a response received by the second communication path, in steps S303 and S304.

Figure 5:
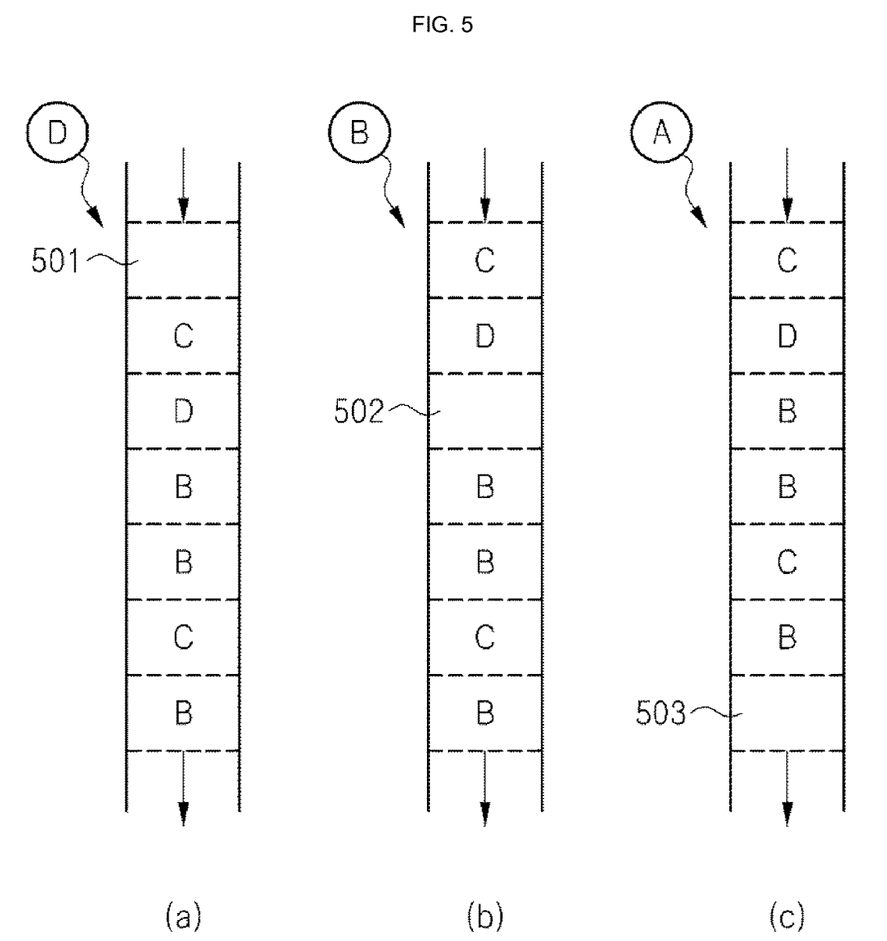
FIG. 5 is a block diagram of an instruction process performed in a management system for a big data processing device of FIG. 1.

In at least one embodiment, the system management agent node 120 may compare a rank code about an importance of an instruction including an installation specification information for the distributed database received from the system management master node 110 and a rank code of an instruction stored in the queue to insert the instruction into a specific position of the queue. For example, referring to (a) in FIG. 5, the system management agent node 120 may insert the instruction into the rear of the queue 501 without comparing a rank code in the instruction with a rank codes of instructions stored in the queue when the system management agent node 120 receives a rank code D regarding an importance of an instruction including an installation specification information for the distributed database. For another example, referring to (b) in FIG. 5, the system management agent node 120 may compare a rank code in the instruction with a rank codes of instructions stored in the queue to insert the instruction into a middle of the queue 502 when the system management agent node 120 receives a rank code B regarding an importance of an instruction including an installation specification information for the distributed database. For another embodiment, referring to (c) in FIG. 5, the system management agent node 120 may promptly insert the instruction into the front of the queue 503 without comparing a rank code in the instruction with rank codes of instructions stored in the queue when the system management agent node 120 receives a rank code A regarding an importance of an instruction including an installation specification information for the distributed database.

The system management agent node 120 may implement the instruction stored in the queue and may transmit an activation state for a specific distributed database to the system management master node through the first communication path periodically at prescribed time periods, in steps S305 and S306.

The system management master node 110 may check the activation state for the specific distributed database received periodically to store installation specification information for the specific distributed database in the system management database 220 when the activation for the specific distributed database is normal, in steps S307 and S308. Herein, the system management database 220 may be connected with the system management master node 110 to manage the installation specification information for the distributed database.

The system management master node 110 may check the activation state for the specific distributed database received periodically to analyze an installation error identification code of the distributed database to improve the activation state for the specific distributed database and to retransmit the improved installation specification information for the specific distributed database to the system management agent node 120 when the activation state for the specific distributed database is abnormal, in step S308.

In at least one embodiment, the system management agent node 120 may transmit an error identification code to the system management master node 110 when the error occurs during an installation procedure of the specific distributed database. The error identification code may include an installation path error code for the distributed database, an installation specification error code or an installation information error code.

Figure 6A:
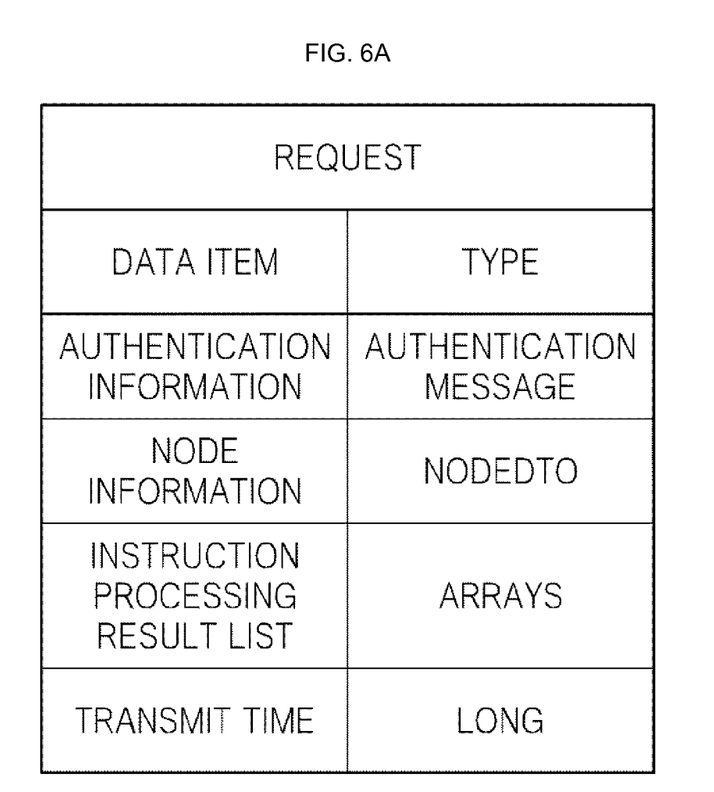
FIG. 6A is a block diagram a data transmitted through a first communication path in a management system for a big data processing device of FIG. 1.
Figure 6B:
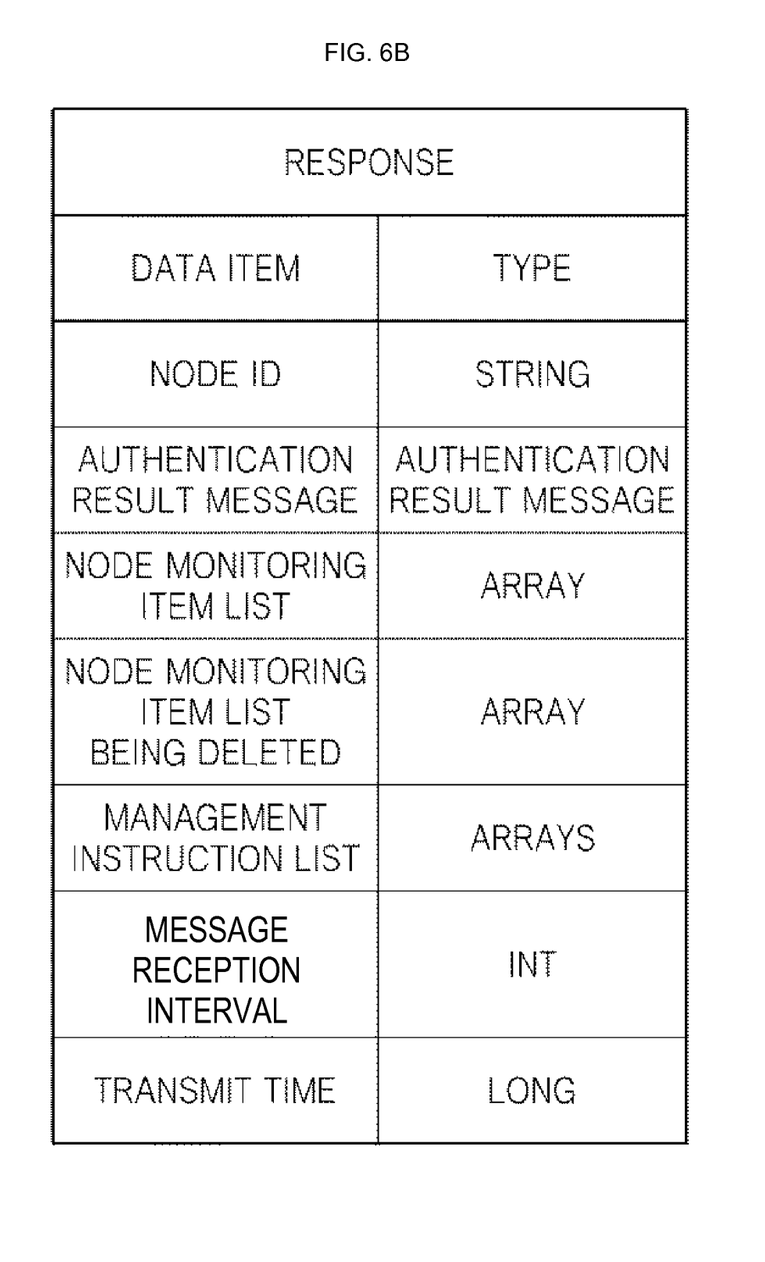
FIG. 6B is a block diagram a data transmitted through a second communication path in a management system for a big data processing device of FIG. 1.

FIG. 6A is a block diagram a data transmitted through a first communication path in a management system for a big data processing device of FIG. 1, and FIG. 6B is a block diagram a data transmitted through a second communication path in a management system for a big data processing device of FIG. 1.

Referring to FIG. 6A, the system management agent node 120 may transmit a message including a system management agent node 120 authentication information, a node identification information, a processing result list about an instruction received from the system management master node 110 and a transmit time to the system management master node 110 through the first communication path.

In at least one embodiment, the system management agent node 120 authentication information may correspond to an authentication message. The authentication message may correspond to information authenticating legality of the system management agent connected with the system management master node 110. The node identification information may correspond to a unique number for the system management agent node 120. The processing result list for the instruction received from the system management master node 110 may correspond to an instruction implementation processing result being comprised of arrays. The transmit time may correspond a time when the message is transmitted from the system management agent node 120 to the system management master node 110. Herein, a type of the time may be set to a type of long.

Referring FIG. 6B, the system management master node 110 may transmit the message including an identification information for a node 120 (node ID), an authentication result information, a monitoring item list, a receive interval for a message received from the system management agent node 120 and a transmit time to the system management agent node 120 through the second communication path.

In at least one embodiment, the identification information for the system management agent node 120 (node ID) may correspond to an identification value for identifying the system management agent node 120 in the system management master node 110 (e.g. the identification value may be set to a type of string). The system management agent node authentication result information may correspond to a result authenticated to legality for the system management agent node 120 connected with the system management master node 110. The node monitoring item list may correspond to monitoring target items of the distributed database. The received interval for the message received from the system management agent node 120 may correspond to a time when the message is transmitted from the system management master node 110 to the system management agent node 120 (e.g. a type of the message may be set to a type of int). The transmit time may correspond to a time when the message is transmitted from the system management master node 110 to the system management agent node 120. Herein, a type of the time may be set to a type of long.

As broadly described and embodied herein, a management system and method for a big data processing device may be described that is capable of integrally managing installation, setting and control for a big data system based on a distributed database at a single PC server.

Embodiments may provide a management system and method for a big data processing device capable of transmitting a state information message for a distributed database through asymmetric communication.

Embodiments may provide a management system and method for a big data processing device capable of inserting an instruction into a specific position of a queue according to a processing importance of the instruction.

In at least one embodiment, a provide a management system for a big data processing device may include a system management master node, and a system management agent node including a first request-based communication path for the system management master node and a second response-based communication path for the system management master node, the system management agent node configured to detect whether an instruction is in a response received from the second communication path or not.

In at least one embodiment, the system management agent node may store the instruction into a queue when the instruction is detected from the response received from the second communication path.

In at least one embodiment, the instruction may correspond to installation specification information for a distributed database, the installation specification information requested by a client from the system management master node.

In at least one embodiment, the system management master node may transmit, to the system management agent node, the instruction including the installation specification information for the distributed database through the second communication path.

In at least one embodiment, the system management master node may install a specific distributed database according to the installation specification information and may transmit an activation state for the specific database through the first communication path to the system management master node in every specific time.

In at least one embodiment, the system management master node may store the installation specification information for the specific distributed database into a system management database when the activation state for the specific database for the specific distributed database is normal.

In at least one embodiment, the system management master node may transmit an error identification code to the system management master node when an error occurs during an installation procedure of the specific distributed database.

In at least one embodiment, the system management master node may analyze the error identification code to improve the activation state for the specific distributed database and to retransmit the installation specification information for improved specific distributed database to the system management agent node.

In at least one embodiment, the system management master node may check importance of the instruction to include a rank code for the importance thereof into the instruction and to transmit the rank code included instruction to the system management agent node.

In at least one embodiment, the system management agent node may compare the rank code for the rank code included instruction and a rank code of a queue stored instruction to insert the rank code included instruction into a specific position of the queue.

In at least one embodiment, the first communication path may include an authentication information request message for the system management agent node, an identification message for the system management agent node, a state information message for the system management agent node and a processing result message for the instruction.

In at least one embodiment, the second communication path may include an authentication result for the system management agent node, a monitoring setting message for the system management agent node and a list for the instruction.

In at least one embodiment, a management method for a big data processing device performed in a management system therefor including a system management master node and a system management agent node, the management method may include (a) establishing first and second communication paths between the system management master node and the system management agent node, (b) detecting whether an instruction including installation specification information for a distributed database is in a response received through the second communication path from the system management agent node or not and (c) storing the instruction into a queue when the instruction is detected from the response received through the second communication path from the system management agent node.

In at least one embodiment, the management method may further include (d) the system management agent node sequentially installing a specific distributed database according to an instruction stored into the queue.

In at least one embodiment, the management method may further include (e) the system management agent node transmitting activation state for the specific distributed database through the first communication path in every specific time to the system management master node.

In at least one embodiment, the management method further include the system management master node storing the installation specification information for the specific distributed database into a system management database when the activation state for the specific distributed database is normal.

Embodiments may integrally manage installation, setting and control for a big data system based on a distributed database at a single PC server. Embodiments may transmit a state information message for a distributed database through asymmetric communication. Embodiments may insert an instruction into a specific position of a queue according to a processing importance of the instruction.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A management system for a big data processing device comprising:
   a system management master node that includes hardware components; and
   at least one system management agent node communicatively coupled to the system management master node over a network, wherein the at least one system management agent node includes hardware components, wherein the hardware components of the at least one system management agent node includes a queue,
   wherein a first communication path is provided for transmitting data from the at least one system management agent node to the system management master node, and a second communication path is provided for transmitting data from the system management master node to the system management agent node,
   wherein the system management agent node is configured to detect whether an instruction is included in a response received over the second communication path, wherein the system management agent node stores the instruction in the queue, at the system management agent node, when the instruction is detected in the response from the system management master node received over the second communication path, wherein the instruction corresponds to installation specification information for a distributed database, the installation specification information being requested by a client to be provided from the system management master node, wherein the system management master node transmits, to the system management agent node, the instruction including the installation specification information for the distributed database through the second communication path, wherein the system management master node determines an importance of the instruction, and based on the determined importance, the system management master node to add specific content including a rank code into the instruction, and the system management master node transmits the rank code included in the instruction through the network and over the second communication path to the system management agent node, wherein the system management agent node receives the rank code in the instruction, and the system management agent node to provide the received instruction including the rank code at a specific position in the queue without comparison, wherein when the system management agent node receives the rank code in the instruction and the queue at the system management agent node already includes a plurality of previously stored instructions, the system management agent node to perform the following:

insert the instruction including a first rank code at a front of the queue having the previously stored instructions without comparison to any rank code of the previously stored instructions in the queue, and insert the instruction including a second rank code at a rear of the queue having the previously stored instructions without comparison to any rank code of the previously stored instructions in the queue, wherein the system management agent node installs a prescribed distributed database according to the installation specification information, and the system management agent node transmits, through the first communication path to the system management master node, an activation state for the prescribed database periodically at a prescribed time period, and wherein the system management agent node transmits, over the first communication path, an error identification code to the system management master node when an error occurs during an installation procedure of the prescribed distributed database.

2. The management system of claim 1, wherein the system management master node stores the installation specification information for the prescribed distributed database into a system management database when the activation state for the specific database for the specific distributed database is normal.

3. The management system of claim 1, wherein the system management master node analyzes the error identification code to improve the activation state for the prescribed distributed database and retransmits the installation specification information based on the analysis to the system management agent node.

4. The management system of claim 1, wherein the system management agent node compares the rank code included instruction to a rank code of instructions stored in a queue to place the received instruction in the queue based on the rank code.

5. The management system of claim 1, wherein the system management agent node sends to the system management master node over the first communication path at least one of an authentication information request message, an identification message for the system management agent node, a state information message for the system management agent node or a processing result message for the instruction.

6. The management system of claim 5, wherein the system management master node sends to the system management agent node over the second communication path at least one of an authentication result for the system management agent node, a monitoring setting message for the system management agent node or a list for the instruction.

7. The management system of claim 1, wherein the hardware components of the system management master node includes at least one of a communication library and a web service module.

8. The management system of claim 1, wherein the hardware components of the system management agent node includes at least one of a communication library, a system management agent, and a monitoring module.

9. A management method for a big data processing device performed in a management system therefor including a system management master node and a system management agent node, wherein the system management master node includes hardware components, and the system management agent node includes hardware components, the management method comprising:

establishing first and second communication paths between the system management master node and the system management agent node;

detecting, by the system management agent node, whether an instruction including installation specification information for a distributed database is included in a response received through the second communication path from the system management master node;

when the instruction is included in the response, storing the instruction in a queue at the system management agent node, wherein the system management agent node stores the instruction in the queue at the system management agent node when the instruction is detected in the response from the system management master node received over the second communication path, wherein the instruction corresponds to installation specification information for a distributed database, the installation specification information being requested by a client to be provided from the system management master node, wherein the system management master node transmits, to the system management agent node, the instruction including the installation specification information for the distributed database through the second communication path, wherein the system management master node determines an importance of the instruction, and based on the determined importance, the system management master node to add specific content including a rank code into the instruction, and the system management master node transmits, over the second communication path, the rank code included in the instruction to the system management agent node, wherein the system management agent node receives the rank code in the instruction, and the system management agent node to provide the received instruction including the rank code at a specific position in the queue without comparison, wherein when the system management agent node receives the rank code in the instruction and the queue at the system management agent node already includes a plurality of previously stored instructions, the system management agent node to perform the following:

insert the instruction including a first rank code at a first of the queue having the previously stored instructions without comparison to any rank code of the previously stored instructions in the queue, and insert the instruction including a second rank code at a rear of the queue having the previously stored instructions without comparison to any rank code of the previously stored instructions in the queue, wherein the system management agent node transmits an activation state for the prescribed distributed database through the first communication path periodically to the system management master node, and wherein the system management agent node transmits, over the first communication path and to the system management master node, an error identification code when an error occurs during an installation procedure of the prescribed distributed database.

10. The management of claim 9, wherein the system management agent node sequentially installs the distributed database according to the instruction stored in the queue.

11. The management method of claim 9, wherein the system management master node stores the installation specification information for the prescribed distributed database in a system management database when the activation state for the prescribed distributed database is normal.

12. The management method of claim 9, wherein the hardware components of the system management master node includes at least one of a communication library and a web service module.

13. The management method of claim 9, wherein the hardware components of the system management agent node includes at least one of a communication library, a system management agent, and a monitoring module.

* * * * *